INVENTOR.
CARL H. ROHRER

April 22, 1969  C. H. ROHRER  3,439,527
APPARATUS FOR TESTING GAS MAINS
Filed May 12, 1967

INVENTOR.
CARL H. ROHRER
BY
Woodard, Weikart, Emhardt & Naughton
Attorneys

United States Patent Office 3,439,527
Patented Apr. 22, 1969

3,439,527
APPARATUS FOR TESTING GAS MAINS
Carl H. Rohrer, 1501 Hale Ave.,
Fort Wayne, Ind. 46804
Filed May 12, 1967, Ser. No. 637,995
Int. Cl. G01m 3/08
U.S. Cl. 73—40.5      2 Claims

ABSTRACT OF THE DISCLOSURE

An apparatus for testing gas mains characterized by an elongated cylindrical structure that is sealed into the segment of a gas line to be tested by means of two inflatable rubber members. A guiding structure cooperatively associated with the elongated structure aids in moving the testing apparatus along the gas main after a section has been tested. A venting structure allows pressure gas to be fed through the cylindrical structure to keep up the service to the customers while the main is being tested. The apparatus is placed in the main and sealed therein by inflating or otherwise deforming the two rubber members. High pressure gas is fed into the area between the two inflated members and low pressure gas is fed through the elongated structure so that service to customers on either side of the sealed area is not interrupted. A microphone may be used to hear the noise of a leak and transmit this to earphones ground level.

Background of the invention

This invention relates to apparatus and methods for testing gas mains for leaks and more particularly relates to apparatus and methods adapted to test gas mains for leaks in such a manner that gas service is not interrupted during the testing operation.

There are a number of prior art methods of locating leaks in gas mains. One method is to mount an electronic device on a truck that travels slowly along the streets over the gas mains. Samples of air are collected at the street level and run through the device. The electronic machine is sensitive enough to detect minute traces of gas in the air over the pavement that has managed to trickle though cracks or porous portions of the asphalt or concrete. However, if the gas main lies under water this method is totally ineffective because the hole in the pipe is submerged and the gas is effectively sealed off assuming the hydrostatic pressure is greater than the gas pressure.

Another conventional method is to drive holes, approximately one inch in diameter, and referred to in the industry as "bar holes," into the ground down to and along side the gas main. If there is a leak present, the gas will find its way to the bar hole where it can be detected by a small portable leak indicator. The meter on the leak indicator indicates roughly the amount of gas entering the bar hole. If the series of such holes are drilled over the main and the leak indicator is used by trained personnel, it is usually possible to pinpoint the leak accurately, excavate around the pipe, and make necessary repairs.

Sometimes the leak in the pipe is adjacent to a drainage tile or conduit and gas enters the drainage tile. When bar holes are made, the leak is discovered perhaps a block away from its true source. The apparatus and method of the present invention eliminates that discrepancy in identifying the source of the leak.

Where the mains are lying in water, as is often the case, and where the hydrostatic pressure of the water in the ground above the pipes exceeds the gas pressure in the main, the water will enter the gas main, and no gas will leak out, thus making the above described conventional methods of leak detection useless. This entry of water into the main is highly undesirable since the water then enters the gas stream by absorption and causes freezing of the customers' meters when it leaves the relatively warm ground and enters the cold outside meter. The method and apparatus of the present invention overcomes this water problem by introducing high pressure gas between sealing members causing the gas to bubble up through the water if the gas main is submerged, making the conventional methods again effective.

Summary

The shortcomings and disadvantages of the prior leak detection methods are overcome by the apparatus and method of the present invention. An excavation is made at a point adjacent a portion of a main to be tested. A segment of the main is removed and one of the free ends capped off. Since gas enters the mains at both ends, service is not interrupted to customers whose lines are fed by the capped-off main. The testing apparatus is inserted into the other portion of the main and sealed therein by a sealed end cap.

The apparatus generally consists of an elongated cylindrical structure which is substantially less in diameter than the diameter of the main to be tested. A deformable sealing member taking the form of an inflatable rubber bag is carried by either end of the cylindrical member. Once the testing apparatus has been positioned in the portion of the main to be tested, the bags are inflated thereby sealing off a segment of the main.

Low pressure gas is allowed to flow through the central tubular member so that service is not interrupted between portions of the main on opposite sides of the device during the testing.

High pressure gas is fed into the area between the sealing members and between the central cylindrical member and the main to be tested. The gas in the live main is normally, under about one quarter p.s.i. pressure. Gas at this relatively low pressure is channelled through a gas compressor and boosted up between 2 to 200 p.s.i. or more which furnishes the source of high pressure gas placed between the sealing members (inflated bags). When high pressure is shut off, a subsequent loss of pressure in space between the inflated bags acting as sealing members would indicate, assuming the seals are not leaking, that there is a leak between the two inflated bags in the pipe wall. If this is the case, constant pressure of sufficient magnitude is applied again between the bags to break the water seal over the main. Conventional methods can then be used to locate the leaks, such as by a barring and detecting the presence of gas with a conventional gas leak indicator.

A vacuum pump may also be used to confirm the presence of a leak. A negative pressure or slight vacuum may be placed between the bags, and a continuous oxygen sampling device is used to test the atmosphere in the space between the bags to confirm the presence of a leak, indicated by presence of air, normally absent from natural gas. Thus, if air is present, it can be concluded to be from outside of the main.

Therefore it is a primary object of the present invention to provide a novel apparatus and method for detecting leaks in gas mains.

A further object of the present invention is to provide a means for testing for gas leaks while still keeping customers on either end of the apparatus in service under normal supply pressure of the order of seven inches water column.

It is a further object of the present invention to provide a testing appartus which is movable, incrementally, along the main, so that only one excavation for substantial length of main is necessary.

Brief description of the drawings

The full nature of the invention will be understood from the accompanying drawings and the following description and claims.

Description of the preferred embodiment

Figure 1:
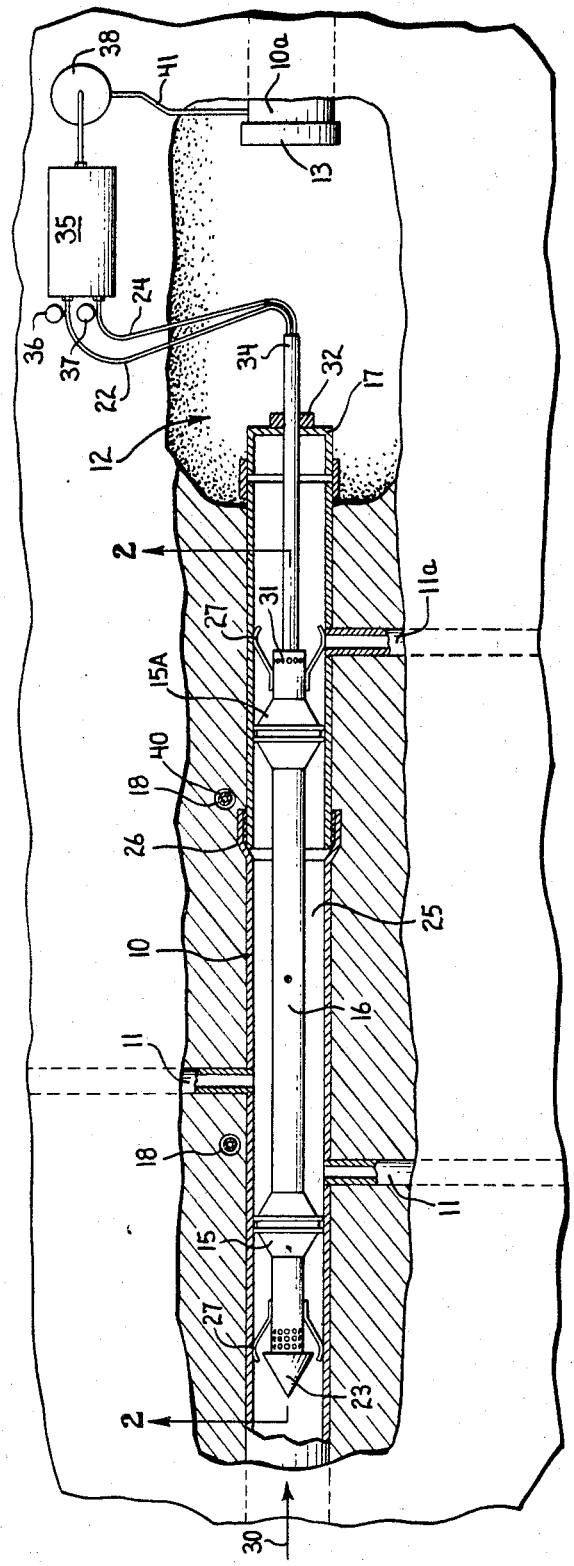
FIG. 1 is a top view, partly in cross section, of a gas main to be tested with the testing appartus positioned therein.

In FIG. 1, there is shown a gas line 10 to be tested. The main line 10 has a plurality of service lines 11 which extend from the main to the customers' houses. The service lines are shown fragmentarily only and do not show the valves and meter attachments.

In order to utilize the present invention, an excavation is made to expose the main as shown generally at 12 in FIG. 1. A portion of the main is removed, and an end cap 13 is placed on the portion of the main 10a which is not under test. Since the gas main is supplied at various locations along its length, main 10a remains pressurized and customer service is not interrupted in this area.

The testing apparatus is positioned in a portion of the main to be tested and rubber bags 15 and 15A are inflated to provide seals for the portion of the main to be tested. It will be understood that some other resiliently deformable sealing mean, as contrasted to the bags, could be used, the functional characteristic necessary being the sealing of the annular space between the sealing members. When the testing apparatus straddles a service line as shown in Fig. 1, the gas inlet valve in the customer's home is turned off during testing. Low pressure gas flowing in the direction of the arrow 30 moves through the central conduit 16 of the testing apparatus and on through the main to service lines downstream of the test apparatus. An end seal 17 caps off the free end of the main being tested. Live gas from the main 10a is fed through a compressor 38 at ground level and fed back, at greatly increased pressure, into the annular area between the inflated rubber bags. This high pressure gas overcomes the water pressure present and, if any leaks are present, bubbles will be produced on the exterior surface of the pipe at the leak. This high pressure gas will also be forced into the service line and any leaks therein may also be similarly detected.

Normally from four to ten foot sections are tested at a time, although the length may vary. Once one section is completed, the bags are deflated, and the testing apparatus is moved axially along the main to a new section of the main to be tested. Thus, increments of the main can be tested by deflating the rubber bags, moving the apparatus to a new position in the main, and reinflating the rubber bags thus eliminating the necesstiy for excavation at each increment to be tested. If a leak is detected somewhere between the rubber bags, that is, in the length increment under test, bar holes (not shown) may be made to more accurately pinpoint the precise position of the leak.

Figure 2:
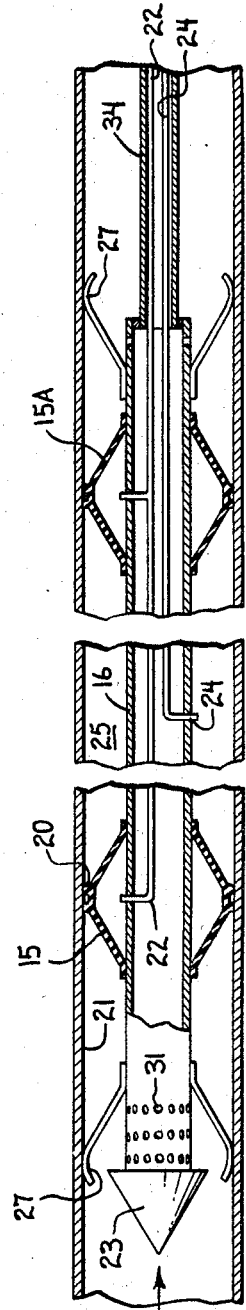
FIG. 2 is a fragmentary enlarged sectional view taken generally along lines 2—2 of Fig. 1 and viewed in the direction of the arrows.

Referring to FIG. 2, the apparatus of the present invention is shown in greater detail. Each of the inflatable bags carry ridges 20 which contact the inner wall 21 of the gas main when the rubber chambers are inflated to make a gas tight seal with the inside wall of the main. Tubing 22 is used to inflate and deflate the rubber bags in order to seal off the chamber to be tested. A cone shaped guard 23 is attached to the central cylindrical member 16 at its free end to prevent dirt from entering the pipe. Any combination of pipe sizes can be used, but it has been found that a central conduit 16 of from two to four inches less in diameter than the main to be tested produces optimum results.

Conduit 24 provides a means of applying pressure to the chamber 25 which is sealed off by the inflated rubber bags.

In operation, the line increment under test includes the service lines 11 and the typical bell and spigot pipe joints 26 which are tested for leaks under a high pressure gas flow along with the sections of the gas mains between the bags. Steel outriggers 27 are used to keep the bags from rubbing against the bottom of the main when the testing apparatus is being moved.

After the apparatus is positioned in the main, the temporary end seal 17 is attached to the end of the main being tested. Gas in the main at each end of the testing apparatus flows in the direction of the arrow 30 and is at conventional service pressure (four to fifteen inches water column). This gas enters the conduit 16 via apertures 31 and flows through the conduit, providing a bypass while the main is being tested, thereby keeping the customers in service (the customer on service line 11a of FIG. 1, for example) while the particular section of the gas main is under test.

The slip seal joint 32 allows the moving of the tester progressively through the main so that sections of the main may be sequentially tested.

Fifteen to twenty foot sections of pipe 34 are used to push the testing apparatus through the main. The gas compressor and vacuum pump 38 are located above ground level. A pressure tank 35 is used as an accumulator to maintain a source of gas pressure of the order of 150 p.s.i. Gauges 36 and 37 determine the gas pressure in the inflatable bags (line 22) and in the annular test space between the gas main and the conduit (line 24), respectively. Suitable gas pressure regulators (not shown) may also be inserted in these lines adjacent the gauges. A microphone may be used to detect the noise of the leak. Bar holes 18 (FIG. 1), extending from the street surface down to the gas main may be utilized to accommodate a sampling tube 40 (FIG. 1) for detection of gas due to leaks.

Figure 3:
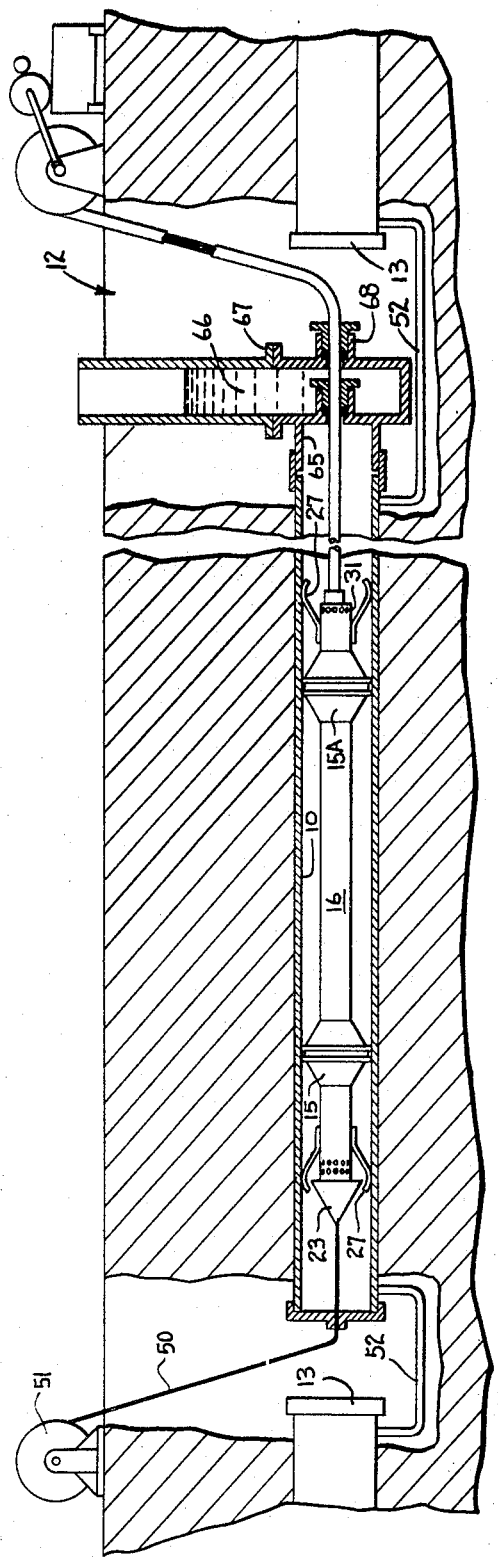
FIG. 3 is second embodiment of the present invention.

Referring to FIG. 3, rather than using sections of pipe 34 to push the tester through the main, a steel cable 50 may be attached to one end of the detecting apparatus. A cable and conduits are also wound around a reel 72 at ground level so that the testing apparatus can be pulled through the main.

The service connection 11 (FIG. 1) on the gas main increment being tested is also tested by shutting off the valve of the customer's meter, the service line thus also being subjected to high pressure. If the sealing elements (15, 15A) are sealed tightly against the main and there is no pressure drop a time interval after the application of high pressure, it may be assumed that there is no leak either in the section of the main being tested or in the communicating service line. In addition, if the test area may be placed under a vacuum and if, under analysis, no oxygen is present in the reduced pressure area or if it is impossible to obtain a flow through the analyzer, the fact that there is no leakage present will be verified.

It may sometimes be necessary in order to maintain a continuous flow of gas through the section of the main being tested to utilize pipe 52 (FIG. 3) between the main being tested and the live gas main which is sealed off. This insures that all customers may be kept in service except those taking their supply on service lines between the sealing elements during testing. When the bags are inflated sealing off the test area, the service line may be cleaned by disconnecting the customer's gas meter and allowing the relatively high pressure to blow dust and water out of the service line. When the arrangement of FIG. 3 is utilized, the inflatable bags can be pressurized by separate supply lines thereby permitting pressure of each bag to be controlled separately. At the start of the test, only the front bag need be inflated until the first leak is found and, subsequently, the rear bag can be inflated to localize the leak. In this embodiment, a conventional hydraulic sealing chamber 65 is utilized to seal gas in and lubricate the seal. Liquid 66 overcomes the gas pressure in the main and prevents leakage through the seal. A flanged pipe 67 extends upwardly accommodating the liquid column and a slip ring seal 68 is utilized.

Figure 4:
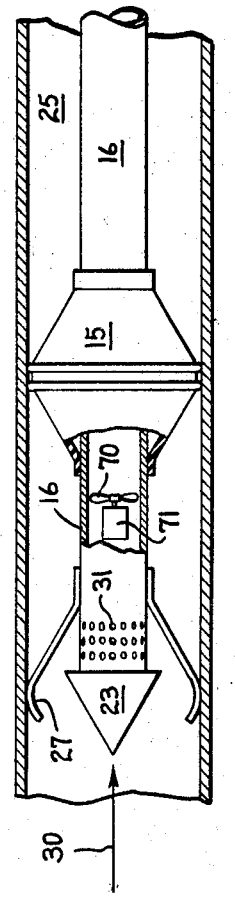
FIG. 4 is a third embodiment of the present invention.

Referring to FIG. 4, a fan 70 may be provided within the conduit 16 to furnish a method of temporarily boosting or relieving a low pressure condition in the area until the larger mains can be laid or another supply can be arranged. An electric motor 71 with the fan within the enclosure boosts the pressure through the bypass if a greater flow is needed for customer service.

After leak detection has been accomplished, the space 25 between the inflatable bags may be filled with a liquid sealer and placed under pressure to fill the leaks in the bell and spigot joints. After an appropriate curing period, the excess fluid may be pumped out through the vacuum line. In the liquid sealing processes, presently in use, it is necessary to take the main out of service. Using the leak detection method of the present invention, a portion of the main can be treated for leakage for an extended curing period while customers are kept in service by means of the internal bypass through pipe 16.

A closed circuit television camera can be placed between the bags and the condition of the interior of the gas main observed or photographed and treated for leaks and coated against internal corrosion. Utilizing the methods in apparatus of the present invention, time cases to be as important as is the case with conventional methods of leak detecting end sealing. Customers can be kept in service for days utilizing the internal bypass if necessary, while segments of the main or services are being observed or treated.

I claim:

1. A testing apparatus for detecting leaks in gas mains and gas service lines comprising:
   a conduit having a smaller diameter than the main to be tested, said conduit having a first end and a second end between which is defined the portion of the gas main to be tested for leaks;
   a first deformable sealing means secured to said conduit adjacent to said first end thereof, and a second deformable sealing means spaced from the first and secured to said conduit adjacent to said second end thereof said sealing means being sealed against the inner surface of the gas main when deformed and withdrawn from said inner surface when restored;
   means for deforming said sealing means when said apparatus is in position within the portion of the main to be tested and for restoring said sealing means when the said apparatus is to be moved axially through said main to seal off another increment of said main for testing;
   guide means for moving said apparatus through said main to be tested, said guide means being cooperatively associated with said second end of said conduit, said means for deforming said sealing means extending through said guide means and into said conduit;
   means for directing high pressure gas into the portion of the main to be tested between said spaced sealing means, said means extending through said guide means and communicating with the annular space between the exterior surface of said conduit and the interior surface of the gas main, said conduit being open to said main on opposite sides of said sealing means to permit gas passage therethrough to provide gas communication bypassing said portion of the main being tested.

2. An apparatus as claimed in claim 1, wherein said first and second inflatable sealing means are inflatable bags.

References Cited

UNITED STATES PATENTS

| 1,652,472 | 12/1927 | Erwin et al. | |
| 2,192,155 | 2/1940 | Schuldt | 73—40.5 |
| 2,273,984 | 2/1942 | Osborn. | |
| 2,715,444 | 8/1955 | Fewel. | |
| 2,731,827 | 1/1956 | Loomis | 73—40.5 |
| 3,085,423 | 4/1963 | Champion | 73—40.5 |
| 3,165,920 | 1/1965 | Loomis | 73—40.5 |
| 3,338,088 | 8/1967 | Smith et al. | 73—46 |

FOREIGN PATENTS 762,629  11/1956  Great Britain.

LOUIS R. PRINCE, *Primary Examiner.*

J. NOLTON, *Assistant Examiner.*